Patented June 24, 1924.

1,498,800

UNITED STATES PATENT OFFICE.

JOHN LEWIS, OF LONDON, ENGLAND, ASSIGNOR TO LAMINA LIMITED, OF LONDON, ENGLAND.

MANUFACTURE OF POULTRY AND ANIMAL FOODS FROM WASTE AND CONDEMNED FOOD AND THE LIKE.

No Drawing.    Application filed September 4, 1923.   Serial No. 660,938.

*To all whom it may concern:*

Be it known that I, JOHN LEWIS, of 48 The Avenue, Brondesbury Park, London, England, a subject of the King of Great Britain and Ireland, have invented certain new and useful Improvements in or Relating to the Manufacture of Poultry and Animal Foods from Waste and Condemned Foods and the like, of which the following is a specification.

This invention relates to the manufacture of poultry and animal foods from waste or similar foods as collected from restaurants and households and condemned foods by processes in which hot air or steam is employed to dry the product.

The object of this invention is to produce a product which to some extent may be in a granular form the balance being crushed or ground to any fine or granular form as may be desired.

The manufacture of poultry and animal foods in accordance with this invention is characterized in that some fatty moisture is extracted by centrifugal extraction in conjunction with wet steam before drying and the product then dried by dry air or dry steam at a high temperature with a low pressure, which low pressure is maintained in the drier.

In one method of manufacturing food in accordance with this invention the waste when received at the factory is discharged on to a sorting table, and the raw material which is used in the manufacture of the improved food is sorted out.

From the sorting table, the waste passes to hoppers and into disintegrators, which tear the material into a conglomerate mass, and it then falls into centrifugal extractors where wet steam is injected into the material while the extractors are in operation about 25 per cent of fatty moisture being extracted in this manner. The material then falls into a vat and is conveyed by elevator into a hopper of the drier which dries the material in a period of from 35–40 minutes. The mean temperature in the drier should be between 400° F. and 500° F.; the entrance heat would be about 800° F. and the exhaust heat under 240° F. The driers should be of such a construction that the hot air or superheated steam comes in contact with the material, and that the latter passes through in from 35 to 40 minutes, thereby ensuring perfect sterilization and thorough cooking. In passing through the drier, in which a low pressure is maintained, 30 to 35% of moisture is extracted under favourable conditions; the material is then conveyed to two screens $\frac{1}{8}$ and $\frac{1}{4}''$ mesh. The material which passes through the screens is then pulverized to a suitable size. During elevation from the drier to the screens, the material is cooled by draught, and also during the progress of the material through the screens.

The fatty moisture which comes away from the extractor is conveyed by channels to a sump, which material is then pumped to rendering tanks for treatment.

It is advisable to allow the material to remain in the storage bins for at least two days before packing as the material then becomes more matured and in such form as will allow it to keep almost indefinitely which is a very important consideration as the material must not under any condition be packed whilst warm.

I have found that a suitable food may be made according to the following proportions and in the following manner;

The waste treated was found on analysis to contain approximately 50% meat, 30% fish and 20% vegetable. This waste is first spread out and raked over to remove anything that may be detrimental to the machinery or the food and is then collected and transferred to the hoppers of the pulverizer which is arranged to reduce the material to about $\frac{1}{2}$ inch squares. The material is then taken to a centrifugal extractor in which about 25% of the fatty moisture that it contains is extracted by centrifugal action in conjunction with wet steam injected into the material as described above. This fatty moisture contains about 50% to 60% of fat. From the extractor the material is taken to a mixing drum after which it passes to a drier.

The drier has a dry air or dry steam superheater attached which brings the temperature of the dry pure air to about 900° F. which air is injected at a temperature of about 800° F. into the drier in which a low pressure is maintained so as to come into direct contact with the wet pulverized material. In the drier the moisture in the material is reduced from about 40% to about 10% to 5%, according to circumstances.

The drier used is a single shell type, revolving on steel tyres at 18 revolutions per minute. The mean temperature in the drier during operation is about 450° F., the hot air passing through and out at the exhaust. The material when discharged has a temperature just under 240° F. The material after being cooled is screened and prepared in any desired form as required for distribution, being then allowed to stand in bins for at least two days before being ready for distribution.

I am aware that it has been proposed to mix with fats etc. the residue obtained after boiling ground carcasses with water, and extracting the liquor by centrifugal separators, and using the mixture as food for poultry; also to separate water from bran and other coarse offal from the manufacture of starch by centrifugal machines, the effect being afterwards dried by steam and used as food for cattle. It has also been proposed to treat garbage by pulping it, extracting the moisture by mechanical means, drying the pulp by means of rotary driers and the heat of steam in a pipe passing through the drier, and tumbling same for producing nodules, at a temperature of over 300° F., cooking the product and screening. Also it has been proposed to prepare a feeding stuff by boiling crushed bones, entrails, etc., in molasses for a short time, separating the liquid, and drying the rest; and I do not claim any of the above processes.

What I claim and desire to secure by Letters Patent is:—

1. A process for the manufacture of poultry and animal foods from waste foods consisting in comminuting the said raw material in order to enhance the extraction of moisture, removing some of the moisture together with a portion of the fat by injecting steam in the material while it is subjected to the action of a centrifugal separator, and drying the material remaining in the said separator in a low pressure drier in connection with a suitable dry superheated gaseous fluid at a high temperature injected into the material while in the drier.

2. A process for the manufacture of poultry and animal foods from waste foods, consisting in sorting, then comminuting the said raw material, extracting fatty moisture by injecting wet steam in the material while it is subjected to the action of a centrifugal separator, passing the material through a mixing drum, and thence into a drier in which a low pressure is maintained, air at 800° F. being injected into the material, which is dried and cooked in the same operation.

In testimony whereof, I affix my signature.

JOHN LEWIS.